United States Patent
Miao

(10) Patent No.: US 11,250,066 B2
(45) Date of Patent: Feb. 15, 2022

(54) METHOD FOR PROCESSING INFORMATION, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventor: Shiqian Miao, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 7 days.

(21) Appl. No.: 17/030,582

(22) Filed: Sep. 24, 2020

(65) Prior Publication Data
US 2021/0294855 A1  Sep. 23, 2021

(30) Foreign Application Priority Data

Mar. 17, 2020  (CN) .......................... 202010186633.1

(51) Int. Cl.
G06F 16/9035  (2019.01)
G06F 16/16  (2019.01)
H04L 29/08  (2006.01)

(52) U.S. Cl.
CPC ........ G06F 16/9035 (2019.01); G06F 16/162 (2019.01); G06F 16/164 (2019.01); H04L 67/04 (2013.01)

(58) Field of Classification Search
CPC .. G06F 16/9035; G06F 16/162; G06F 16/164; H04L 67/04
USPC ........................................................ 707/822
See application file for complete search history.

(56) References Cited

U.S. PATENT DOCUMENTS

| | | | | |
|---|---|---|---|---|
| 2008/0294607 | A1* | 11/2008 | Partovi | G06Q 30/00 |
| 2009/0043755 | A1* | 2/2009 | Faris | G06F 16/958 |
| 2013/0346197 | A1* | 12/2013 | Zhou | G06Q 30/0251 |
| | | | | 705/14.53 |

(Continued)

FOREIGN PATENT DOCUMENTS

CN  106484688 A  3/2017

OTHER PUBLICATIONS

Sadeghi, Seyedeh Sargol, et al., "Re-finding Behavior in Vertical Domains", ACM Transactions on Information Systems, vol. 23, No. 3, Article 21, Jun. 2016, pp. 1-30.*

(Continued)

*Primary Examiner* — Robert Stevens
(74) *Attorney, Agent, or Firm* — Novick, Kim & Lee, PLLC; Zhi Yang Xue; Jihun Kim

(57) ABSTRACT

Proposed are a method and an apparatus for processing information, an electronic device and a storage medium. The specific implementation is: receiving a request for browsing information from a terminal, the request comprising a terminal identifier; determining a terminal type based on the terminal identifier; obtaining a vertical category corresponding to the terminal type; obtaining key field information and an attribute tag value of browsing record content corresponding to the vertical category from a preset database based on the terminal identifier; in response to obtaining resource content corresponding to the vertical category, filtering the resource content based on the key field information and the attribute tag value to obtain target resource content; and sending the target resource content to the terminal for display.

15 Claims, 8 Drawing Sheets

(56) References Cited

U.S. PATENT DOCUMENTS

2014/0164913 A1* 6/2014 Jaros .................. G06F 16/9577
716/243

OTHER PUBLICATIONS

Christophe Fournier, "Search Report for EP Application No. 20214937.3". dated Jun. 9, 2021, EPO, Germany, 8 pages.

* cited by examiner

METHOD FOR PROCESSING INFORMATION, ELECTRONIC DEVICE AND STORAGE MEDIUM

CROSS-REFERENCE TO RELATED APPLICATION

This application claims priority to Chinese Patent Application No. 202010186633.1, filed on Mar. 17, 2020, the entire contents of which are incorporated herein by reference for all purpose.

FIELD

The present disclosure relates to the field of information flow technologies in the field of Internet technologies, and more particularly, to a method and apparatus for processing information, an electronic device, and a storage medium.

BACKGROUND

Generally, a terminal obtains resource content from a server through a network request and presents the resource content to a user.

In the related art, in order to avoid displaying the same resource content to a user repeatedly, resource content that has been issued is recorded at a network link interface of the terminal. When another time of issuing resource content is performed, the resource content is compared with the resource content that has been issued and intercepted as necessary to prevent the same resource content from being issued again. However, for example, if the screen of a mobile phone is of a small size, the user usually needs to scroll the screen to see all the content. Therefore, although all the content has been issued to the terminal, it is possible that the user has not actually read all the content, such that there may be problems that the user may never be able to some of the content.

SUMMARY

According to a first aspect, a method for processing information is provided. The method is implemented in a server, and includes: receiving a request for browsing information from a terminal, the request comprising a terminal identifier; determining a terminal type based on the terminal identifier; obtaining a vertical category corresponding to the terminal type; obtaining key field information and an attribute tag value of browsing record content corresponding to the vertical category from a preset database based on the terminal identifier; in response to obtaining resource content corresponding to the vertical category, filtering the resource content based on the key field information and the attribute tag value to obtain target resource content; and sending the target resource content to the terminal for display.

A second aspect of the present disclosure provides an electronic device. The electronic device includes at least one processor and a storage device communicatively connected to the at least one processor. The storage device stores an instruction executable by the at least one processor. When the instruction is executed by the at least one processor, the at least one processor may implement the method for processing information as described above.

A third aspect of the present disclosure provides a non-transitory computer-readable storage medium having a computer instruction stored thereon. The computer instruction is configured to make a computer implement the method for processing information as described above.

It should be understood that the content described in Summary is not intended to identify key or important features of embodiments of the present disclosure, nor is it intended to limit the scope of the present disclosure. Other features of the present disclosure will become readily appreciated from the following description.

BRIEF DESCRIPTION OF THE DRAWINGS

The accompanying drawings are used for a better understanding of the solution, and do not constitute a limitation to the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

A method and apparatus for processing information, an electronic device and a storage medium according to embodiments of the present disclosure will be described below with reference to the accompanying drawings.

Figure 1:
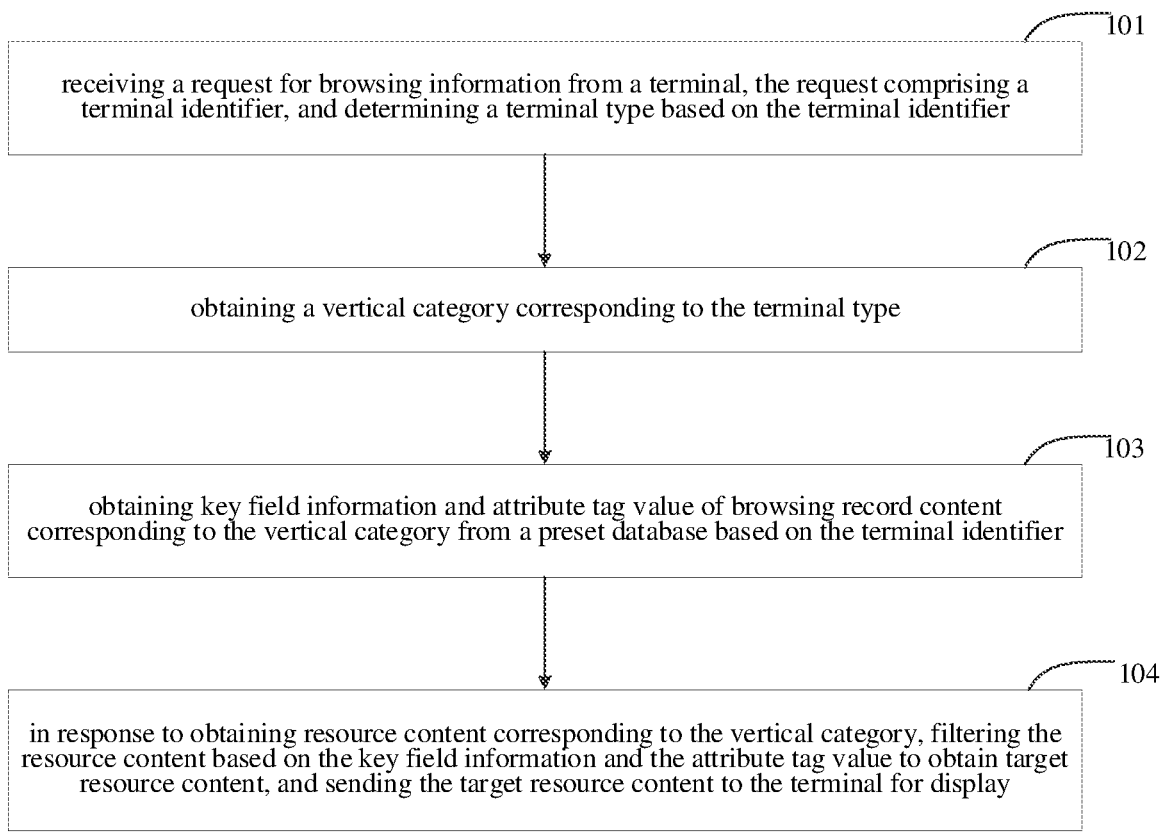
FIG. 1 is a flowchart of a method for processing information according to Embodiment 1 of the present disclosure.

FIG. 1 is a flowchart of a method for processing information according to Embodiment 1 of the present disclosure. The method for processing information according to embodiments of the present disclosure is described in the context of server side.

In detail, in the related art, resource content that has been issued is recorded at a network link interface of a terminal. When another time of issuing resource content is performed, the resource content is compared with the resource content that has been issued and intercepted as necessary to prevent the same resource content from being issued again. However, there may be a situation where content issued that has not been actually browsed by a user is filtered out, which easily causes some content to be permanently blocked, that is, the user may never see some resource content. In addition, there are problems such as little content remains after the content is filtered, and it is not possible to perform personalized filtering based on specific application scenes of the terminal.

The present disclosure provides a method for processing information. A request for browsing information is received from a terminal. The request includes a terminal identifier. A terminal type is determined based on the terminal identifier. A vertical category corresponding to the terminal type is obtained. Key field information and an attribute tag value of browsing record content corresponding to the vertical category are obtained from a preset database based on the terminal identifier. In response to obtaining resource content corresponding to the vertical category, the resource content is filtered based on the key field information and the attribute tag value to obtain target resource content. The target resource content is sent to the terminal for display. Consequently, it is possible to perform personalized filtering based on different vertical categories, such that the accuracy of browsing filtering is improved, the risk that part of the content will be permanently blocked in a conventional manner of issuing and recording is avoided, and browsing experience of the user is improved.

As illustrated in FIG. 1, the method for processing information may include the following steps.

At block 101, a request for browsing information is received from a terminal. The request includes a terminal identifier. A terminal type is determined based on the terminal identifier.

At block 102, a vertical category corresponding to the terminal type is obtained.

In the present disclosure, the terminal may be a vehicle-mounted terminal, a smart wearable device (such as a smart watch), a mobile phone, and other terminals. It may be understood that different terminals correspond to different application scenes of pushing and displaying content, for example, resource content pushed to a vehicle-mounted terminal is mainly music, news, and so on. In addition, in consideration of a size of a display interface of the terminal, in order to meet different needs of different users, different vertical categories and a number of pushed resources of content for browsing corresponding to each of the vertical categories may be set for different terminals. For example, the content for browsing corresponding to a category of news is five pieces of news.

Accordingly, the present disclosure may set one or more vertical categories, such as music, video, and news, based on different terminal types.

In detail, after receiving the request (which includes the terminal identifier) for browsing information from the terminal through a network request, the terminal type may be determined based on the terminal identifier. For example, the terminal type may be a vehicle-mounted terminal, that is, the specific application scene is a vehicle-mounted application scene. And then, the vertical category corresponding to the terminal may be obtained. For example, vertical categories corresponding to the vehicle-mounted terminal are music, video, and news, that is, one or more vertical categories corresponding to the terminal type may be obtained. Content for browsing corresponding to each vertical category may be deduplicated and filtered in subsequent processing.

The terminal identifier may be a login account, a terminal serial number, etc., which may be set as required.

At block 103, key field information and attribute tag value of browsing record content corresponding to the vertical category are obtained from a preset database based on the terminal identifier.

It may be understood that the present disclosure sets different deduplication strategies for browsing record content corresponding to different vertical categories based on browsing record content of a user, so the browsing record content corresponding to the terminal is stored in advance.

An exposure event may be set on the terminal for monitoring so as to obtain the browsing record content and to send the browsing record content to a server for storage, so that the server may record the content that the user has actually browsed, and save browsing-related attribute information, such as the time the user spent on watching videos, and what did the user click, a content title, a main body, or a picture? Therefore, the browsing record content is stored independently. In addition, performing monitoring based on the exposure event set for content may capture effective browsing time points in real time, and improve the accuracy of filtering.

Therefore, the key field information and the attribute tag value of the browsing record content corresponding to the vertical category may be determined through referring to an analysis of the browsing record content in advance, and then stored in the database.

Further, the key field information and the attribute tag value of the browsing record content corresponding to the vertical category may be obtained from the preset database based on the terminal identifier. For example, key field information 1-1 and key field information 1-2 of browsing record content 1 corresponding to the vertical category of news, and attribute tag values, click, picture, and a browsing duration of ten seconds, of the browsing record content 1 are obtained. For another example, key field information 2-1 and key field information 2-2 of browsing record content 2 corresponding to the vertical category of videos, and an attribute tag value, playback time of five seconds, of the browsing record content 2 are obtained.

At block 104, in response to obtaining resource content corresponding to the vertical category, the resource content is filtered based on the key field information and the attribute tag value to obtain target resource content. The target resource content is sent to the terminal for display.

The present disclosure performs filtering on the resource content when obtaining the resource content corresponding to the vertical category, that is, when the browsing content corresponding to each vertical category is obtained, the filtering is performed separately.

In detail, the resource content may be filtered based on the key field information and the attribute tag value to obtain the target resource content. The target resource content may be sent to the terminal for display. There are many ways to filter the resource content based on the key field information and the attribute tag value. Examples are illustrated as follows.

In a first example, resource content matched with the key field information is selected as candidate filtering resource content from the resource content. Deduplication is performed on the candidate filtering resource content based on the attribute tag value and an attribute value corresponding to the candidate filtering resource content to obtain target filtering resource content. The target filtering resource content is deleted from the resource content to obtain the target resource content.

In a second example, the deduplication is performed on the resource content based on the attribute tag value and the attribute value corresponding to the resource content to obtain the candidate filtering resource content. And then, the candidate filtering resource content matched with the key field information is selected as the target filtering resource content from the resource content. The target filtering resource content is deleted from the resource content to obtain the target resource content.

It should be noted that when there are multiple vertical categories, the target resource content of each vertical category needs to be merged before being issued to the terminal for display, so as to further improve the browsing experience of the user.

It should be noted that the vertical category may be further segmented, for example, the vertical category of news may be divided into sports news, financial news and technology news.

For example, browsing filtering may be performed separately upon obtaining resource content of news divided into sports news, financial news, and technology news. And then, all the filtered content of the vertical category may be integrated to obtain the target resource content. The target resource content may be sent to the terminal. For example, the current terminal needs to display five pieces of sports news and five pieces of financial news. On the basis of a previous record of news that the user has browsed so far, when obtaining sports news, no more than five pieces of sports news filtered out sports news that the user has browsed are returned, and the same process is performed on financial news. After that, the resource content obtained is integrated and sent to the terminal.

Therefore, through configuring related attribute tag values such as deduplication time for each vertical category, the present disclosure supports that different pieces of resource content in various vertical categories may have different attribute tag values. The attribute tag values may be applied to the logic of a filtering strategy, thereby achieving an effect of presenting different vertical categories for different people. The deduplication filtering is performed when resources are obtained from the resource side, rather than after the resources are taken out from the resource side and to be sent to the terminal.

With the method for processing information, the request for browsing information is received from the terminal. The request includes the terminal identifier. The terminal type is determined based on the terminal identifier. The vertical category corresponding to the terminal type is obtained. The key field information and the attribute tag value of the browsing record content corresponding to the vertical category are obtained from the preset database based on the terminal identifier. In response to obtaining the resource content corresponding to the vertical category, the resource content is filtered based on the key field information and the attribute tag value to obtain the target resource content. The target resource content is sent to the terminal for display. Consequently, it is possible to perform personalized deduplication based on different vertical categories, such that the accuracy of filtering resource content is improved, and the risk that part of the content will be permanently blocked in a conventional manner of issuing and recording is avoided.

Based on the description of the foregoing embodiment, the exposure event may be set on the terminal for monitoring. After a piece of resource content is exposed on the terminal, relevant information of the content is reported to the server through a network request. The implementation will be described in detail with reference to FIG. 2.

Figure 2:
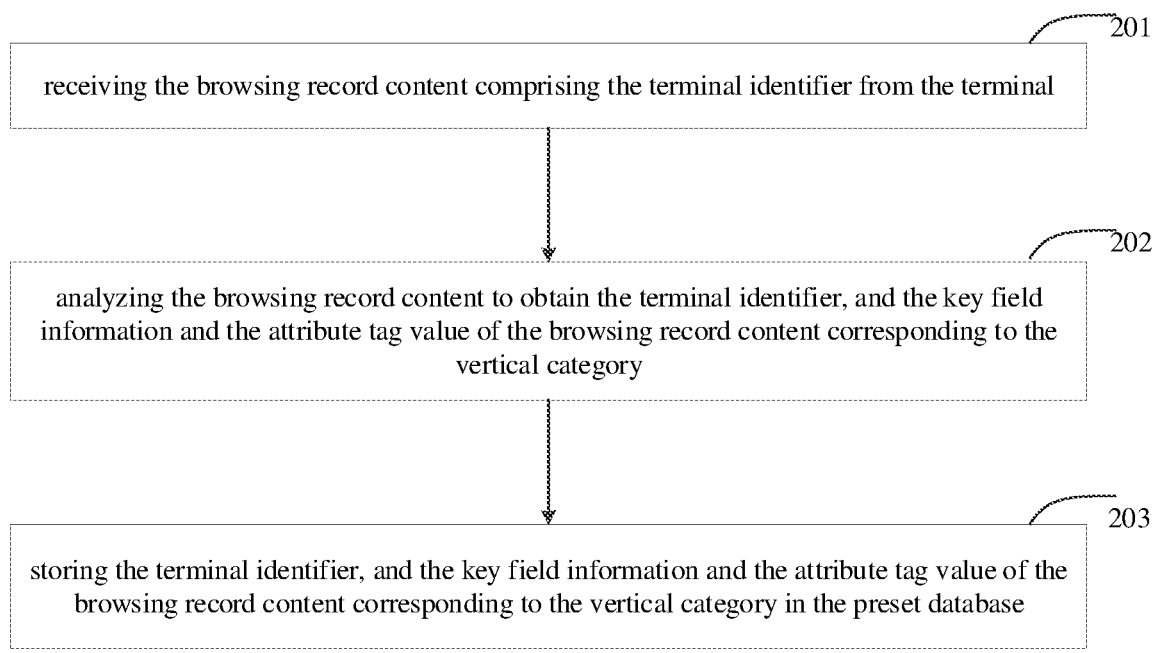
FIG. 2 is a flowchart of a method for processing information according to Embodiment 2 of the present disclosure.

FIG. 2 is a flowchart of a method for processing information according to Embodiment 2 of the present disclosure. As illustrated in FIG. 2, before step 101, the method further includes the following steps.

At block 201, the browsing record content including the terminal identifier is received from the terminal.

At block 202, the browsing record content is analyzed to obtain the terminal identifier, and the key field information and the attribute tag value of the browsing record content corresponding to the vertical category.

At block 203, the terminal identifier, and the key field information and the attribute tag value of the browsing record content corresponding to the vertical category are stored in the preset database.

In detail, the server may obtain the browsing record content, and analyze the browsing record content to obtain the terminal identifier, and key field information and an attribute value of each piece of resource content under each vertical category. For example, attribute values of resource content 1 are clicking on an image and browsing for two seconds, and attribute values of resource content 2 are clicking on a link and browsing for five seconds. Based on the attribute values, an attribute tag value corresponding to each piece of resource content may be generated. The resource content meeting a certain attribute tag value indicates that the user has browsed the resource content. For example, attribute values indicate clicking and browsing for five seconds or more.

Therefore, only the content that is actually exposed will be actually recorded, and attributes such as expiration time may also be set for the browsing record content, so as to realize a mechanism of automatically deleting records passing the expiration time, and further improve the experience of content browsing.

Therefore, the terminal identifier, and the key field information and the attribute tag value of the browsing record content corresponding to the vertical category are stored in the preset database, such that during filtering, key field information and attribute tag values of multiple pieces of browsing record content of corresponding vertical categories are directly obtained from the database so as to performing filtering on the resource content, thereby improving the effectiveness of processing. Storing browsing records independently and monitoring base on the exposure event may capture effective browsing time points in real time, improve the accuracy of browsing filtering, and avoid the risk that part of the content will be permanently blocked in a conventional manner of issuing and recording.

Therefore, instead of being performing at a link interface after each piece of resource content is obtained, deduplication filtering is performed when each piece of resource content is obtained from the resource side, so that a required amount of resource content may be obtained at the resource side from resource content remained after the deduplication filtering. In this manner, a problem of a reduction in content caused by the deduplication filtering may be avoided. For each vertical category, key field information of the resource content may be compared with key field information of the browsing record content based on attributes, such as time, set in advance for content corresponding to each vertical category. On the basis of a unified policy, an interception processing is performed on content satisfying standards of filtering. Consequently, it is guaranteed that content returned from each vertical category meets requirements of display.

Therefore, after resource content returned by each vertical category is merged, the merged resource content is issued to each terminal through the network link interface, and displayed based on an established display strategy of the terminal Based on the description of the foregoing embodiments, there are many ways to filter the resource content based on the key field information and the attribute tag value to obtain the target resource content and to send the target resource content to the terminal for display. The ways will be exemplified in detail below with reference to FIG. 3.

Figure 3:
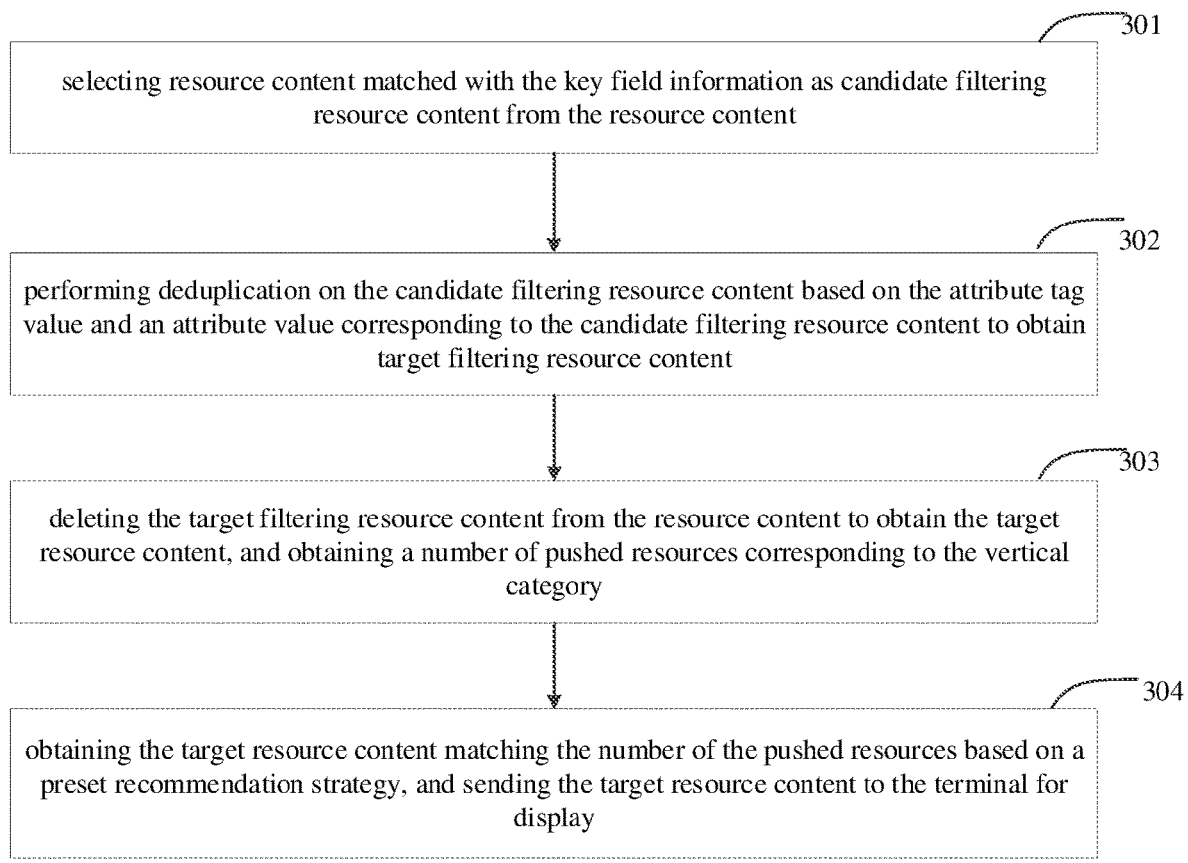
FIG. 3 is a flowchart of a method for processing information according to Embodiment 3 of the present disclosure.

FIG. 3 is a flowchart of a method for processing information according to Embodiment 3 of the present disclosure. As illustrated in FIG. 3, the method includes the following steps.

At block 301, resource content matched with the key field information is selected as candidate filtering resource content from the resource content.

In detail, each piece of key field information is matched with each piece of resource content. A successful match indicates that the user has browsed corresponding resource content before, and the successfully matched resource content is selected as the candidate filtered resource content.

At block 302, deduplication is performed on the candidate filtering resource content based on the attribute tag value and an attribute value corresponding to the candidate filtering resource content to obtain target filtering resource content.

In detail, in order to further improve the accuracy of filtering, the attribute tag value may be generated based on the browsing record content to further deduplicate the candidate filtering resource content, such as an attribute tag value of time. The attribute value corresponding to the candidate filtering resource content is an attribute value that was recorded before. For example, the candidate filtering resource content is video 1 and video 2, an attribute value corresponding to video 1 is playing for two seconds, and an attribute value corresponding to video 2 is playing for ten seconds. If the attribute tag value of time is five seconds, only when a video is equal to or longer than a duration represented by the attribute tag value of time, it may be determined that the video had been watched. Therefore, the resource content of video 2 may be deleted, and the resource content of video 1 may be retained, that is, video 2 is selected as the target filtering resource content.

At block 303, the target filtering resource content is deleted from the resource content to obtain the target resource content, and a number of pushed resources corresponding to the vertical category is obtained.

At block 304, the target resource content matching the number of the pushed resources is obtained based on a preset recommendation strategy, and sent to the terminal for display.

In detail, deleting the target filtering resource content from the resource content to obtain the target resource content may be understood as that the resource content corresponding to each vertical category may be one or more pieces, and the number of the pushed resources displayed under the vertical category on the terminal is limited. Consequently, the number of the pushed resources corresponding to the vertical category is obtained, and the target resource content matching the number of the pushed resources is obtained based on the preset recommendation strategy, and sent to the terminal for display.

The target resource content may be sorted based on user preferences, real-time popularity, etc., and then the first target resource content of the number of the pushed resources may be sent to the terminal for display, such that the browsing experience of the user may be further improved.

With the method for processing information according to embodiments of the present disclosure, the resource content matched with the key field information is selected as the candidate filtering resource content from the resource content. The deduplication is performed on the candidate filtering resource content based on the attribute tag value and the attribute value corresponding to the candidate filtering resource content to obtain the target filtering resource content. The target filtering resource content is deleted from the resource content to obtain the target resource content, and the number of the pushed resources corresponding to the vertical category is obtained. The target resource content matching the number of the pushed resources is obtained based on the preset recommendation strategy, and sent to the terminal for display. Therefore, compared with the conventional rigid and unified filtering, the method according to embodiments of the present disclosure may increase application scenes of such a deduplication logic, and improve the browsing experience of the user.

Based on the description of the above embodiments, it may be understood that filtering is performed based on application scenes of different terminal types, that is, vertical categories corresponding to different terminal types are different. Detailed description will be given below with reference to FIG. 4.

Figure 4:
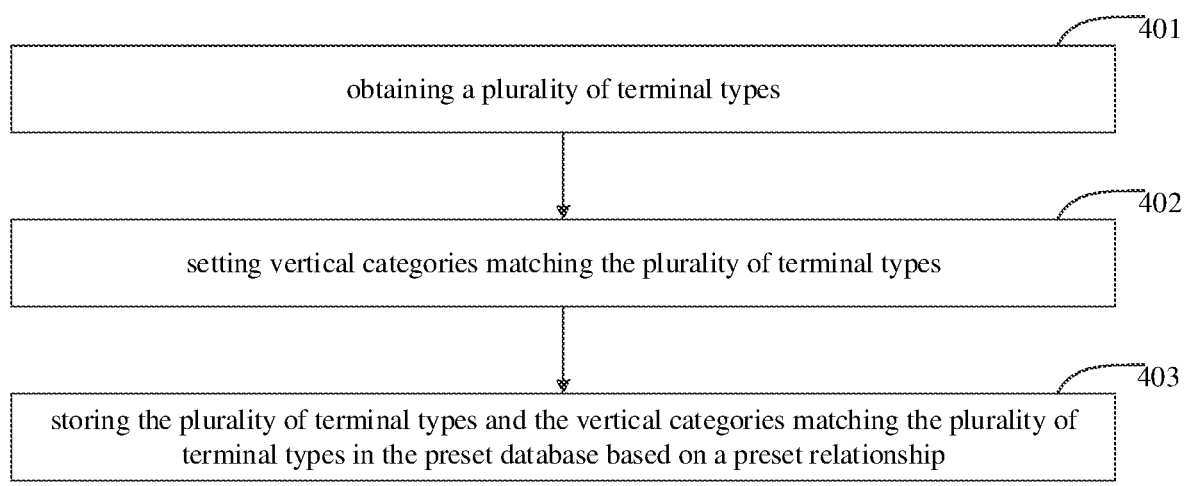
FIG. 4 is a flowchart of a method for processing information according to Embodiment 4 of the present disclosure.

FIG. 4 is a flowchart of a method for processing information according to Embodiment 4 of the present disclosure. As illustrated in FIG. 4, before step 101, the method further includes the following steps.

At block 401, a plurality of terminal types are obtained

At block 402, vertical categories matching the plurality of terminal types are set.

At block 403, the plurality of terminal types and the vertical categories matching the plurality of terminal types are stored in the preset database based on a preset relationship.

In detail, for content that needs to be presented to the user on the terminal, vertical categories may be divided appropriately based on a current terminal type, so that subsequently, different deduplication strategies may be performed based on different vertical categories. In this manner, characteristics of each vertical category may be properly displayed, and the user may obtain a satisfying browsing experience. In detail, the vertical categories matching the plurality of terminal types may be set, and the plurality of terminal types and the vertical categories matching the plurality of terminal types may be stored in the preset database based on the preset relationship.

To implement the above embodiments, the present disclosure provides an apparatus for processing information.

Figure 5:
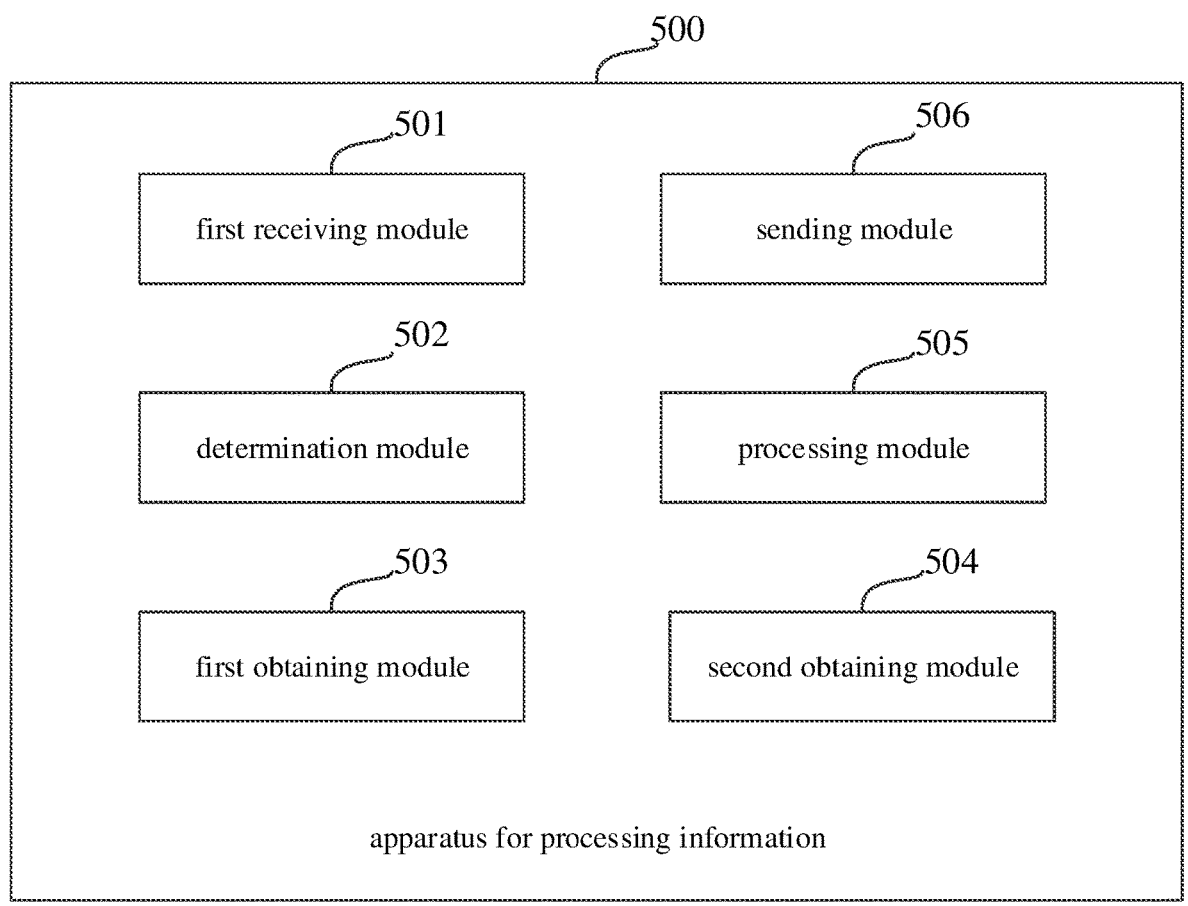
FIG. 5 is a schematic diagram of an apparatus for processing information according to Embodiment 5 of the present disclosure.

FIG. 5 is a schematic diagram of an apparatus for processing information according to Embodiment 5 of the present disclosure.

As illustrated in FIG. 5, an apparatus for processing information 500 may include a first receiving module 501, a determination module 502, a first obtaining module 503, a second obtaining module 504, a processing module 505, and a sending module 506.

The first receiving module 501 is configured to receive a request for browsing information from a terminal. The request includes a terminal identifier.

The determination module 502 is configured to determine a terminal type based on the terminal identifier.

The first obtaining module 503 is configured to obtain a vertical category corresponding to the terminal type.

The second obtaining module 504 is configured to obtain key field information and an attribute tag value of browsing record content corresponding to the vertical category from a preset database based on the terminal identifier.

The processing module 505 is configured to, in response to obtaining resource content corresponding to the vertical category, filter the resource content based on the key field information and the attribute tag value to obtain target resource content.

The sending module 506 is configured to send the target resource content to the terminal for display.

Figure 6:
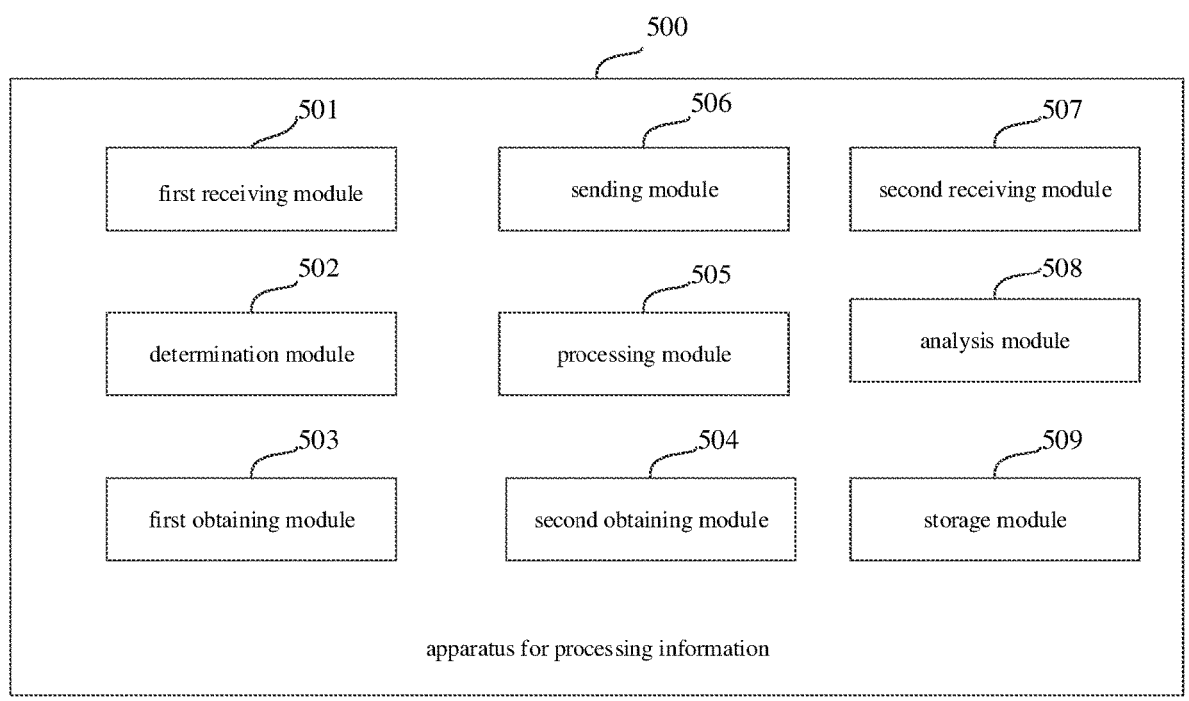
FIG. 6 is a schematic diagram of an apparatus for processing information according to Embodiment 6 of the present disclosure.

As a possible implementation, as illustrated in FIG. 6 and on the basis of FIG. 5, the apparatus further includes a second receiving module 507, an analysis module 508, and a storage module 509.

The second receiving module 507 is configured to receive the browsing record content including the terminal identifier from the terminal.

The analysis module 508 is configured to analyze the browsing record content to obtain the terminal identifier, and the key field information and the attribute tag value of the browsing record content corresponding to the vertical category.

The storage module 509 is configured to store the terminal identifier, and the key field information and the attribute tag value of the browsing record content corresponding to the vertical category in the preset database.

As a possible implementation, the processing module 505 is configured to: select resource content matched with the key field information as candidate filtering resource content from the resource content; perform deduplication on the candidate filtering resource content based on the attribute tag value and an attribute value corresponding to the candidate filtering resource content to obtain target filtering resource content; and delete the target filtering resource content from the resource content to obtain the target resource content.

Figure 7:
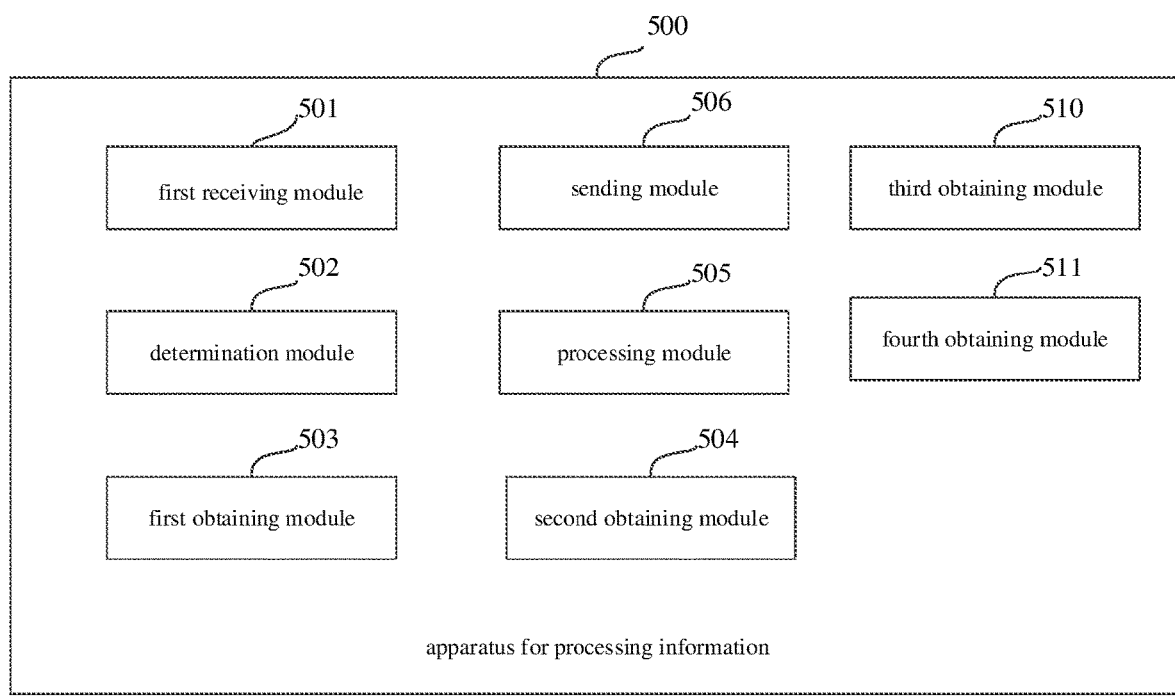
FIG. 7 is a schematic diagram of an apparatus for processing information according to Embodiment 7 of the present disclosure.

As a possible implementation, as illustrated in FIG. 7 and on the basis of FIG. 5, the apparatus further includes a third obtaining module 510 and a fourth obtaining module 511.

The third obtaining module 510 is configured to obtain a number of pushed resources corresponding to the vertical category.

The fourth obtaining module 511 is configured to obtain the target resource content matching the number of the pushed resources based on a preset recommendation strategy.

Figure 8:
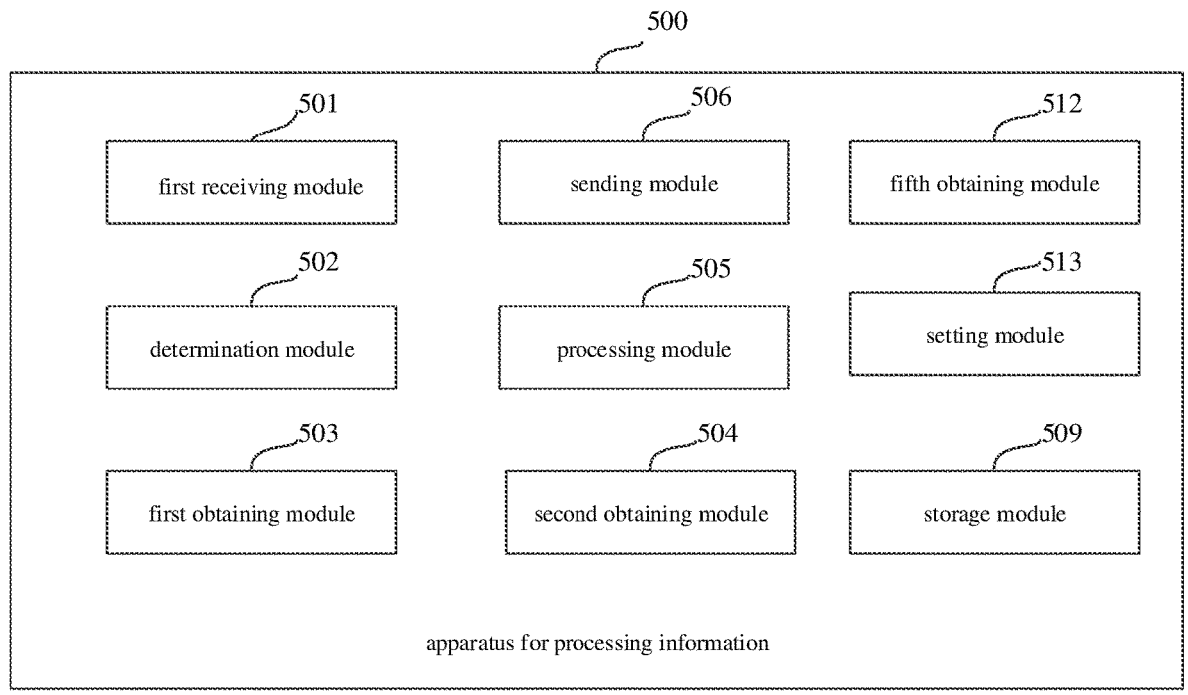
FIG. 8 is a schematic diagram of an apparatus for processing information according to Embodiment 8 of the present disclosure.

As a possible implementation, as illustrated in FIG. 8 and on the basis of FIG. 5, the apparatus further includes a fifth obtaining module 512, a setting module 513 and the storage module 509.

The fifth obtaining module 512 is configured to obtain a plurality of terminal types.

The setting module 513 is configured to set vertical categories matching the plurality of terminal types.

The storage module 509 is configured to store the plurality of terminal types and the vertical categories matching the plurality of terminal types in the preset database based on a preset relationship.

It should be noted that the foregoing explanation of embodiments of the method for processing information is also applicable to the apparatus for processing information according to embodiments of the present disclosure, and no repeated description will be made herein.

With the apparatus for processing information according to embodiments of the present disclosure, the request for browsing information is received from the terminal. The request includes the terminal identifier. The terminal type is determined based on the terminal identifier. The vertical category corresponding to the terminal type is obtained. The key field information and the attribute tag value of the browsing record content corresponding to the vertical category are obtained from the preset database based on the terminal identifier. In response to obtaining the resource content corresponding to the vertical category, the resource content is filtered based on the key field information and the attribute tag value to obtain the target resource content. The target resource content is sent to the terminal for display. Consequently, it is possible to perform personalized deduplication based on different vertical categories, such that the accuracy of filtering resource content is improved, and the risk that part of the content will be permanently blocked in a conventional manner of issuing and recording is avoided.

According to embodiments of the present disclosure, an electronic device and a readable storage medium are provided.

Figure 9:
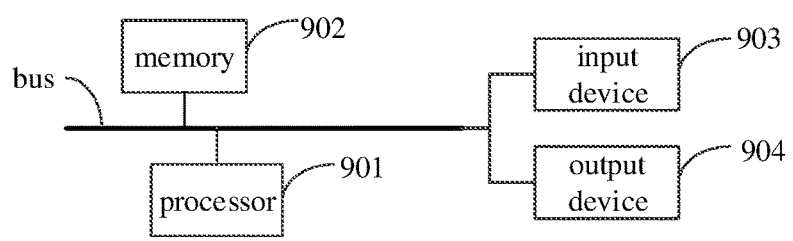
FIG. 9 is a block diagram of an electronic device configured to implement a method for processing information according to embodiments of the present disclosure.

FIG. 9 is a block diagram of an electronic device configured to implement a method for processing information according to embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 9, the electronic device includes: one or more processors 901, a memory 902, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 901 is taken as an example in FIG. 9.

The memory 902 is a non-transitory computer-readable storage medium provided by the present disclosure. The memory stores instructions executable by at least one processor, so that the at least one processor executes the method for processing information provided by the present disclosure. The non-transitory computer-readable storage medium according to the present disclosure stores computer instructions, which are configured to make the computer execute the method for processing information provided by the present disclosure.

As a non-transitory computer-readable storage medium, the memory 902 may be configured to store non-transitory software programs, non-transitory computer executable programs and modules, such as program instructions/modules (for example, the first receiving module 501, the determination module 502, the first obtaining module 503, the second obtaining module 504, the processing module 505, and the sending module 506 illustrated in FIG. 5) corresponding to the method for processing information according to embodiments of the present disclosure. The processor 901 executes various functional applications and performs data processing of the server by running non-transitory software programs, instructions and modules stored in the memory 902, that is, the method for processing information according to the foregoing method embodiments is implemented.

The memory 902 may include a storage program area and a storage data area, where the storage program area may store an operating system and applications required for at least one function; and the storage data area may store data created according to the use of the electronic device that implements the method for processing information, and the like. In addition, the memory 902 may include a high-speed random access memory, and may further include a non-transitory memory, such as at least one magnetic disk memory, a flash memory device, or other non-transitory solid-state memories. In some embodiments, the memory 902 may optionally include memories remotely disposed with respect to the processor 901, and these remote memories may be connected to the electronic device, which is configured to implement the method for processing information, through a network. Examples of the network include, but are not limited to, the Internet, an intranet, a local area network, a mobile communication network, and combinations thereof.

The electronic device configured to implement the method for processing information may further include an input device 903 and an output device 904. The processor 901, the memory 902, the input device 903 and the output device 904 may be connected through a bus or in other manners. FIG. 9 is illustrated by establishing the connection through a bus.

The input device 903 may receive input numeric or character information, and generate key signal inputs related to user settings and function control of the electronic device configured to implement the method for processing information, such as a touch screen, a keypad, a mouse, a trackpad, a touchpad, a pointing stick, one or more mouse buttons, trackballs, joysticks and other input devices. The output device 904 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solution according to embodiments of the present disclosure, the request for browsing information is received from the terminal. The request includes the terminal identifier. The terminal type is determined based on the terminal identifier. The vertical category corresponding to the terminal type is obtained. The key field information and the attribute tag value of the browsing record content corresponding to the vertical category are obtained from the preset database based on the terminal identifier. In response to obtaining the resource content corresponding to the vertical category, the resource content is filtered based on the key field information and the attribute tag value to obtain the target resource content. The target resource content is sent to the terminal for display. Consequently, it is possible to perform personalized deduplication based on different vertical categories, such that the accuracy of filtering resource content is improved, and the risk that part of the content will be permanently blocked in a conventional manner of issuing and recording is avoided.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for processing information, implemented in a server, and comprising:
    receiving a request for browsing information from a terminal, the request comprising a terminal identifier;
    determining a terminal type based on the terminal identifier;
    obtaining a vertical category corresponding to the terminal type;
    obtaining key field information and an attribute tag value of browsing record content corresponding to the vertical category from a preset database based on the terminal identifier;
    in response to obtaining resource content corresponding to the vertical category, filtering the resource content based on the key field information and the attribute tag value to obtain target resource content; and
    sending the target resource content to the terminal for display.

2. The method of claim 1, further comprising:
    receiving the browsing record content comprising the terminal identifier from the terminal;
    analyzing the browsing record content to obtain the terminal identifier, and the key field information and the attribute tag value of the browsing record content corresponding to the vertical category; and
    storing the terminal identifier, and the key field information and the attribute tag value of the browsing record content corresponding to the vertical category in the preset database.

3. The method of claim 1, wherein filtering the resource content based on the key field information and the attribute tag value to obtain the target resource content comprises:
    selecting resource content matched with the key field information as candidate filtering resource content from the resource content;
    performing deduplication on the candidate filtering resource content based on the attribute tag value and an attribute value corresponding to the candidate filtering resource content to obtain target filtering resource content; and
    deleting the target filtering resource content from the resource content to obtain the target resource content.

4. The method of claim 1, further comprising:
    obtaining a number of pushed resources corresponding to the vertical category; and
    obtaining the target resource content matching the number of the pushed resources based on a preset recommendation strategy.

5. The method of claim 1, further comprising:
    obtaining a plurality of terminal types;
    setting vertical categories matching the plurality of terminal types; and
    storing the plurality of terminal types and the vertical categories matching the plurality of terminal types in the preset database based on a preset relationship.

6. An electronic device, comprising:
    at least one processor; and
    a storage device communicatively connected to the at least one processor; wherein,
    the storage device stores an instruction executable by the at least one processor, and when the instruction is executed by the at least one processor, the at least one processor implements the following actions:
    receiving a request for browsing information from a terminal, the request comprising a terminal identifier;
    determining a terminal type based on the terminal identifier;
    obtaining a vertical category corresponding to the terminal type;
    obtaining key field information and an attribute tag value of browsing record content corresponding to the vertical category from a preset database based on the terminal identifier;
    in response to obtaining resource content corresponding to the vertical category, filtering the resource content based on the key field information and the attribute tag value to obtain target resource content; and
    sending the target resource content to the terminal for display.

7. The electronic device of claim 6, wherein when the instruction is executed by the at least one processor, the at least one processor further implement the following actions:
    receiving the browsing record content comprising the terminal identifier from the terminal;
    analyzing the browsing record content to obtain the terminal identifier, and the key field information and the attribute tag value of the browsing record content corresponding to the vertical category; and
    storing the terminal identifier, and the key field information and the attribute tag value of the browsing record content corresponding to the vertical category in the preset database.

8. The electronic device of claim 6, wherein filtering the resource content based on the key field information and the attribute tag value to obtain the target resource content comprises:
    selecting resource content matched with the key field information as candidate filtering resource content from the resource content;
    performing deduplication on the candidate filtering resource content based on the attribute tag value and an attribute value corresponding to the candidate filtering resource content to obtain target filtering resource content; and
    deleting the target filtering resource content from the resource content to obtain the target resource content.

9. The electronic device of claim 6, wherein when the instruction is executed by the at least one processor, the at least one processor further implement the following actions:
    obtaining a number of pushed resources corresponding to the vertical category; and obtaining the target resource content matching the number of the pushed resources based on a preset recommendation strategy.

10. The electronic device of claim 6, wherein when the instruction is executed by the at least one processor, the at least one processor further implement the following actions:
obtaining a plurality of terminal types;
setting vertical categories matching the plurality of terminal types; and
storing the plurality of terminal types and the vertical categories matching the plurality of terminal types in the preset database based on a preset relationship.

11. A non-transitory computer-readable storage medium having a computer instruction stored thereon, wherein the computer instruction is configured to make a computer implement a method for processing information, the method comprising:
receiving a request for browsing information from a terminal, the request comprising a terminal identifier;
determining a terminal type based on the terminal identifier;
obtaining a vertical category corresponding to the terminal type;
obtaining key field information and an attribute tag value of browsing record content corresponding to the vertical category from a preset database based on the terminal identifier;
in response to obtaining resource content corresponding to the vertical category, filtering the resource content based on the key field information and the attribute tag value to obtain target resource content; and
sending the target resource content to the terminal for display.

12. The non-transitory computer-readable storage medium of claim 11, wherein the method further comprises:
receiving the browsing record content comprising the terminal identifier from the terminal;
analyzing the browsing record content to obtain the terminal identifier, and the key field information and the attribute tag value of the browsing record content corresponding to the vertical category; and
storing the terminal identifier, and the key field information and the attribute tag value of the browsing record content corresponding to the vertical category in the preset database.

13. The non-transitory computer-readable storage medium of claim 11, wherein filtering the resource content based on the key field information and the attribute tag value to obtain the target resource content comprises:
selecting resource content matched with the key field information as candidate filtering resource content from the resource content;
performing deduplication on the candidate filtering resource content based on the attribute tag value and an attribute value corresponding to the candidate filtering resource content to obtain target filtering resource content; and
deleting the target filtering resource content from the resource content to obtain the target resource content.

14. The non-transitory computer-readable storage medium of claim 11, wherein the method further comprises:
obtaining a number of pushed resources corresponding to the vertical category; and
obtaining the target resource content matching the number of the pushed resources based on a preset recommendation strategy.

15. The non-transitory computer-readable storage medium of claim 11, wherein the method further comprises:
obtaining a plurality of terminal types;
setting vertical categories matching the plurality of terminal types; and
storing the plurality of terminal types and the vertical categories matching the plurality of terminal types in the preset database based on a preset relationship.

* * * * *